United States Patent
Steinberger et al.

(10) Patent No.: US 7,021,396 B2
(45) Date of Patent: Apr. 4, 2006

(54) SUSPENSION SYSTEM FOR A THREE-POINT APPARATUS

(75) Inventors: Dan P. Steinberger, West Fargo, ND (US); Alan L. Redman, Wahpeton, ND (US); Lawrence F. Bernard, Wahpeton, ND (US); Lesley L. Willemssen, Wahpeton, ND (US)

(73) Assignee: Wil-Rich, LLC, Wahpeton, ND (US)

( * ) Notice: Subject to any disclaimer, the term of this patent is extended or adjusted under 35 U.S.C. 154(b) by 68 days.

(21) Appl. No.: 10/655,893

(22) Filed: Sep. 5, 2003

(65) Prior Publication Data
US 2005/0051347 A1    Mar. 10, 2005

(51) Int. Cl.
*A01B 59/043*    (2006.01)

(52) U.S. Cl. .................. 172/439; 172/678; 239/164

(58) Field of Classification Search ............. 172/439, 172/443, 445.1, 450, 451, 677, 678; 239/164, 239/165, 169, 172; 111/925, 54, 57
See application file for complete search history.

(56) References Cited

U.S. PATENT DOCUMENTS

| | | | | |
|---|---|---|---|---|
| RE22,627 E | * | 4/1945 | McKay | 172/441 |
| 2,742,842 A | * | 4/1956 | Johnson | 172/450 |
| 2,748,686 A | * | 6/1956 | Nelson et al. | 172/128 |
| 3,250,524 A | * | 5/1966 | Boatright | 267/138 |
| 4,834,249 A | | 5/1989 | Dahl | |
| 5,335,856 A | | 8/1994 | Nathan | |
| 5,375,767 A | | 12/1994 | Thorstensson | |
| 5,564,887 A | * | 10/1996 | Brooks | 414/735 |
| 5,884,852 A | | 3/1999 | Balmer | |
| 5,971,295 A | | 10/1999 | Jensen et al. | |
| 6,042,020 A | * | 3/2000 | Weddle | 239/166 |
| 6,047,901 A | | 4/2000 | Pederson et al. | |
| 6,079,193 A | | 6/2000 | O'Neill et al. | |
| 6,131,821 A | | 10/2000 | Nejsum | |
| 6,293,475 B1 | | 9/2001 | Sobolik | |
| 6,315,218 B1 | | 11/2001 | Guesdon | |
| 6,343,661 B1 | * | 2/2002 | Thompson et al. | 172/444 |
| 6,367,712 B1 | | 4/2002 | Larsen | |
| 6,386,554 B1 | | 5/2002 | Weddle | |
| 6,491,234 B1 | | 12/2002 | Beggs | |
| 6,751,894 B1 | * | 6/2004 | Verseef | 37/266 |
| 6,792,704 B1 | * | 9/2004 | Johnson | 37/235 |

OTHER PUBLICATIONS

Hagie Manufacturing Co., 284XP Sprayer, http://www.hagie.com.
John Deere, 4710 Self-Propelled Sprayer, http://www.deere.com.
Kenneth's Sales & Service, Inc., Blumhardt 3-Point Sprayers, http://www.kennethsales.com.
Wylie MFG., Wylie Row Wyng 60ft Boom Sprayer, http://www.wyliesprayers.com.
Miller, NitroSprayer w/ Air-Flex Suspension; http://www.nitrosprayer.com.

* cited by examiner

*Primary Examiner*—Victor Batson
(74) *Attorney, Agent, or Firm*—Duft Bornsen & Fishman, LLP

(57) ABSTRACT

A three-point apparatus is disclosed comprising a hitch system, an implement, and a suspension system. The hitch system is comprised of a base and a three-point interface. The base of hitch system is coupled to the three-point interface of the hitch system. The three-point interface is configured to connect to a three-point system, such as the three-point arms of a tractor. The suspension system is coupled between the base of the hitch system and the implement.

20 Claims, 14 Drawing Sheets

SUSPENSION SYSTEM FOR A THREE-POINT APPARATUS

BACKGROUND OF THE INVENTION

1. Field of the Invention

The invention is related to the field of three-point equipment, and in particular, to a suspension system for a three-point apparatus.

2. Statement of the Problem

Equipment manufacturers produce different equipment for use on the farm, in construction, in the yard, and in the garden. Some equipment is self-propelled, such as tractors, self-propelled sprayers, self-propelled combines, self-propelled lawn mowers, etc. Other equipment is pull-type, such as sprayers, cultivators, planters, etc. Pull-type equipment includes trailer-type units, three-point units, and a hybrid of the two.

Equipment, whether self-propelled or pull-type, may be used in fields, pastures, ditches, etc. The fields, pastures, and ditches may contain ruts, bumps, furrows, holes, and other conditions. Such conditions may damage the equipment over time. Equipment may also generate vibration from the engine, tires, power-take-off, etc. This vibration can also damage the equipment.

Some self-propelled units have a suspension to help protect the unit from damage and improve the ride for the operator when used in rough terrain. One example of a self-propelled unit with a suspension is the 284 XP sprayer from Hagie Manufacturing Company of Clarion, Iowa. The 284 XP sprayer has four wheels with an air spring between each one of the wheels and the frame of the sprayer.

A trailer-type unit is pulled by a tractor and includes a hitch and wheels. The wheels support the weight of the trailer-type unit. The hitch is configured to attach to a draw bar of the tractor so that the tractor can provide forward and backward movement of the unit. The draw bar of the tractor provides little to no support to the weight of the unit.

Fortunately, the flexibility of the attachment point between the tractor and the trailer-type unit helps absorb rough terrain encountered by the tractor. The attachment point helps isolate the trailer-type unit from the rough terrain and from vibrations of the tractor. Some trailer-type units include their own suspension. The suspension and tires of the trailer-type unit also help absorb the rough terrain encountered by the unit. One example of a trailer-type unit with a suspension is an Air Ride Suspension (ARS) trailer sprayer from Wil-Rich LLC of Wahpeton, N. Dak. The ARS trailer sprayer has two wheels with an air spring between each one of the wheels and the frame of the sprayer.

Three-point units are also transported with a tractor. Damage due to rough terrain can be especially a problem for three-point units. Unlike trailer-type units that have flexibility in the attachment point, three-point units are rigidly connected to three-point arms of a tractor with pins. In many three-point units, the three-point arms of the tractor support the entire weight of the unit.

For some three-point units, the only suspension between the three-point unit and the ground is the suspension of the tractor. When a tractor carrying the three-point unit encounters rough terrain, the rigid connection between the tractor and the three-point unit transfers movement of the tractor back to the unit. The movement of the tractor may be a bouncing or jarring movement. The rigid connection also transfers vibration from the tractor back to the three-point unit. The vibration may resonant in the three-point unit. The amount of movement and vibration may depend on whether the tractor has tires or tracks.

The turning radius of a three-point unit may also be a concern. A three-point unit rotates at a larger radius relative to the tractor turning radius in comparison to a trailer-type unit rotating about its attachment point. Fast turns and short correctional turns may add stress to the three-point unit.

One example of the three-point unit is a three-point sprayer from Wil-Rich LLC. In use, the rigid connection between the sprayer and the tractor transfers the movement of the tractor, due to the terrain, back to the sprayer. The movement due to the terrain may cause structural failure in the tank, the supporting structure, and/or the booms of the sprayer over time. This may be a greater concern as the sprayer booms get longer. The liquid in the tank of the sprayer may also slosh around exacerbating the problem. Vibration from the tractor may also damage the tank, booms, and frame over time.

Unfortunately, three-point units have not been effectively designed to reduce movement due to the terrain, vibration, and other damaging movements.

SUMMARY OF THE SOLUTION

The invention helps solve the above problems with a three-point apparatus described herein. The three-point apparatus comprises a hitch system, an implement, and a suspension system. The hitch system is comprised of a three-point interface and a base. The base of the hitch system is coupled to the three-point interface. The three-point interface is configured to connect to a three-point system, such as the three-point arms of a tractor. The suspension system is coupled between the base of the hitch system and the implement.

The suspension system advantageously helps dampen movement between the hitch system and the implement. For instance, if the hitch system is coupled to the three-point arms of a tractor, then the three-point arms transfer the movement of the tractor, due to the terrain, to the hitch system. The suspension system helps absorb the movement of the hitch system to reduce the amount of movement transferred to the implement. The suspension system also helps absorb vibration transferred to the hitch system by the tractor to reduce the amount of vibration transferred to the implement. The suspension system may advantageously increase the life and dependability of the implement by reducing the movement and vibration transferred to the implement.

The invention may include other examples described below.

DESCRIPTION OF THE DRAWINGS

The same reference number represents the same element on all drawings.

DETAILED DESCRIPTION OF THE INVENTION

FIGS. 1–14 and the following description depict specific examples of the invention to teach those skilled in the art how to make and use the best mode of the invention. For the purpose of teaching inventive principles, some conventional aspects of the invention have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

EXAMPLE #1—FIG. 1

Figure 1:
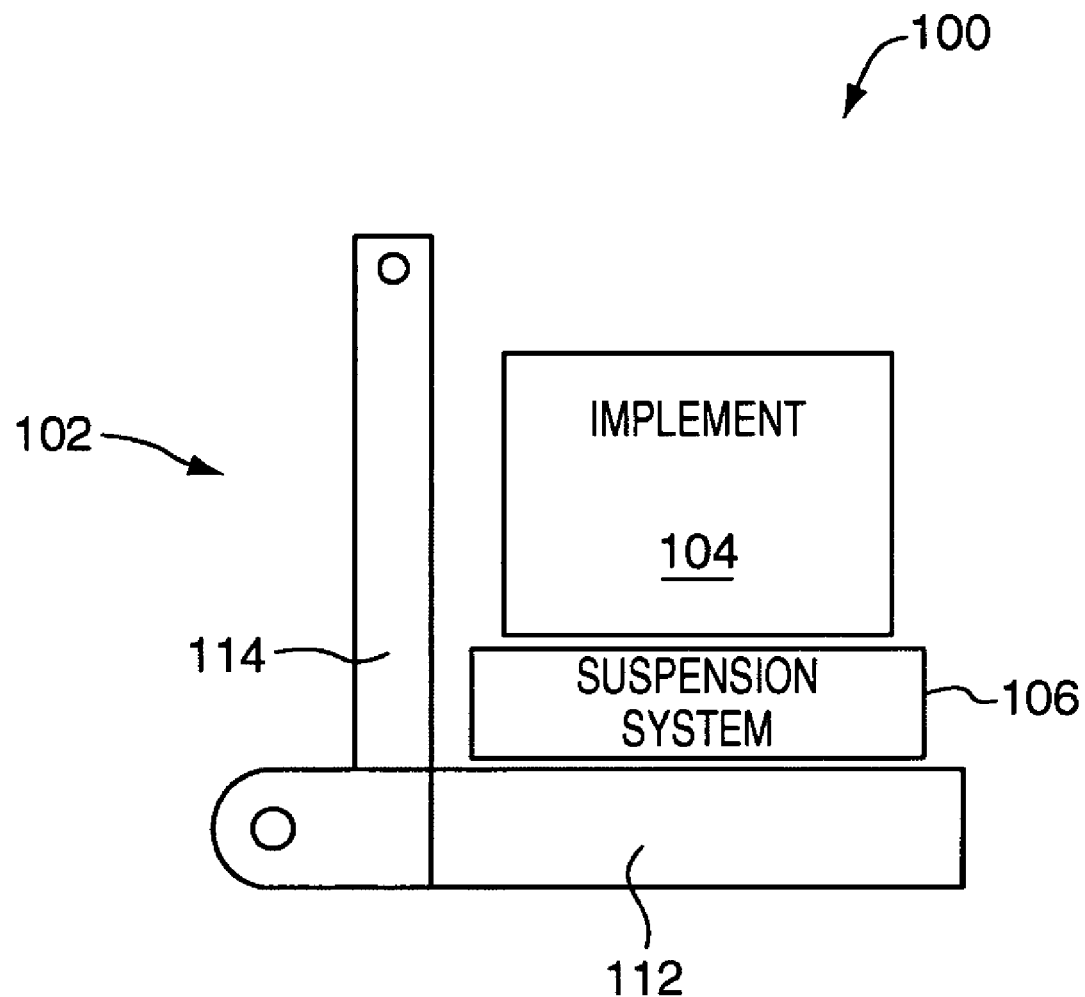
FIG. 1 illustrates a three-point apparatus in an example of the invention.

FIG. 1 illustrates a three-point apparatus 100 in an example of the invention. Apparatus 100 comprises a hitch system 102, an implement 104, and a suspension system 106. Hitch system 102 is comprised of a base 112 and a three-point interface 114.

The following describes three-point apparatus 100. Base 112 of hitch system 102 is coupled to three-point interface 114 of hitch system 102. Three-point interface 114 is configured to connect to a three-point system. A three-point system comprises any system, structure, or mechanism configured to couple to a three-point hitch. An example of a three-point system comprises three-point arms of a tractor. Suspension system 106 is coupled between base 112 of hitch system 102 and implement 104. A suspension system comprises any system, components, or devices configured to dampen movement between two objects. An example of a suspension system comprises one or more air springs or air shocks, one or more springs, one or more shocks, one or more rubber bumpers, etc. An implement comprises any device, equipment, or machinery configured to perform an operation or function. Examples of an implement comprise sprayers, cultivators, row-crop cultivators, planters, drills, plows, para plows, and flail spreaders.

In some examples, suspension system 106 is configured to dampen movement between hitch system 102 and implement 104. For instance, if hitch system 102 is coupled to the three-point arms of a tractor, then the three-point arms transfer the movement of the tractor, due to the terrain, to hitch system 102. Suspension system 106 helps absorb the movement of hitch system 102 to reduce the amount of movement transferred to implement 104. Suspension system 106 also helps absorb vibration transferred to hitch system 102 by the tractor to reduce the amount of vibration transferred to implement 104. Suspension system 106 may advantageously increase the life and dependability of implement 104 by reducing the movement and vibration transferred to implement 104.

EXAMPLE #2—FIGS. 2–7

Figure 2:
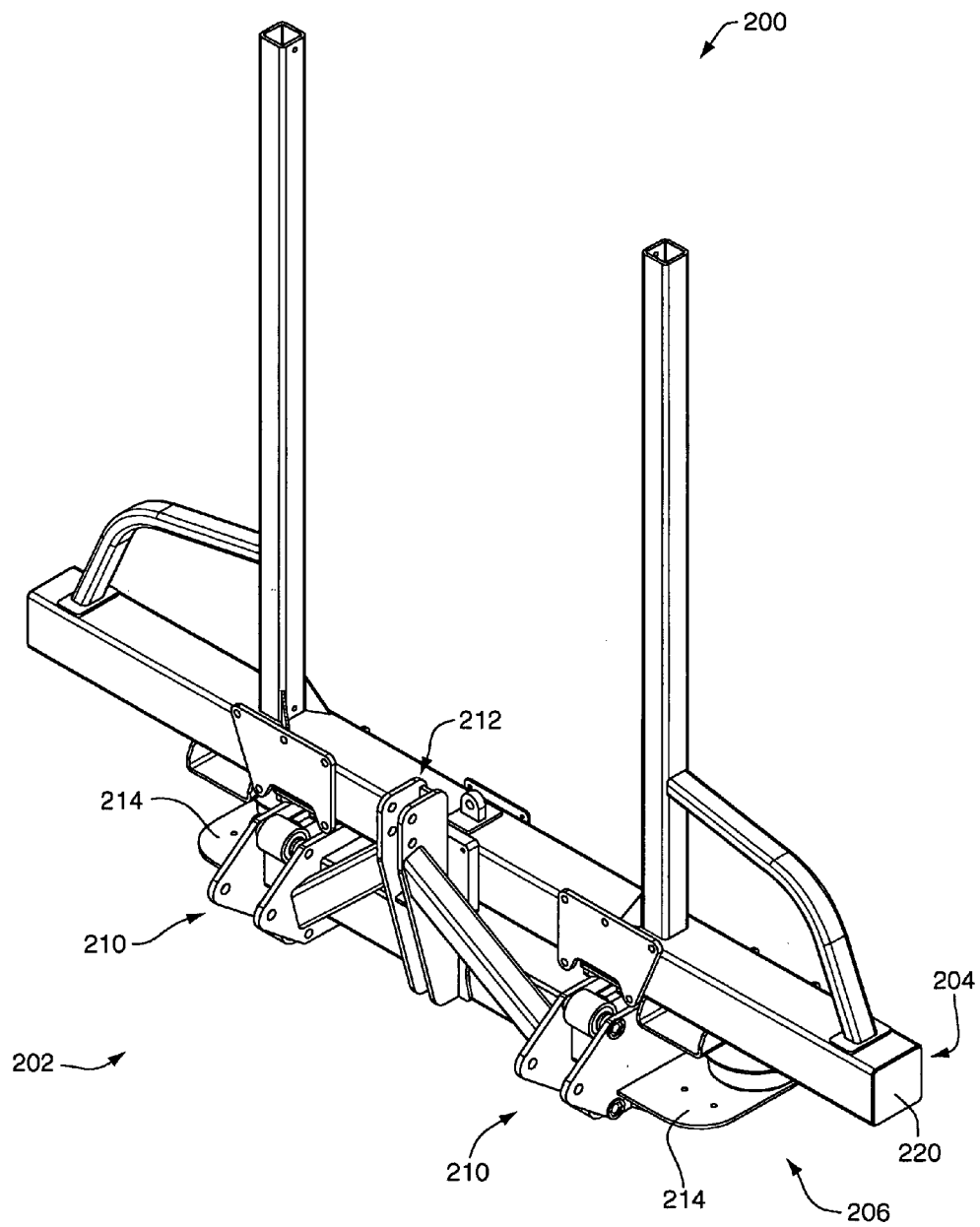
FIG. 2 illustrates an isometric view of agricultural equipment in an example of the invention.

FIG. 2 illustrates an isometric view of agricultural equipment 200 in an example of the invention. Equipment 200 is comprised of a three-point hitch 202, an implement 204, and an air suspension 206. Air suspension 206 is coupled between three-point hitch 202 and implement 204.

Three-point hitch 202 includes two lower three-point interfaces 210 and an upper three-point interface 212 connected together by support bars. Lower three-point interfaces 210 are configured to couple to the lower three-point arms of a tractor (not shown). Upper three-point interface 212 is configured to couple to the upper three-point arm of a tractor. Three-point hitch 202 also includes support bases 214 that connect to the lower three-point interfaces 210.

Implement 204 includes a main frame 220. Main frame 220 may comprise the frame of a sprayer, a cultivator, a row-crop cultivator, a planter, a drill, a plow, a para plow, a flail spreader, or any other three-point implement. The structure of implement 204 is just an example, and implement 204 may comprise other structures not illustrated in FIG. 2.

Figure 3:
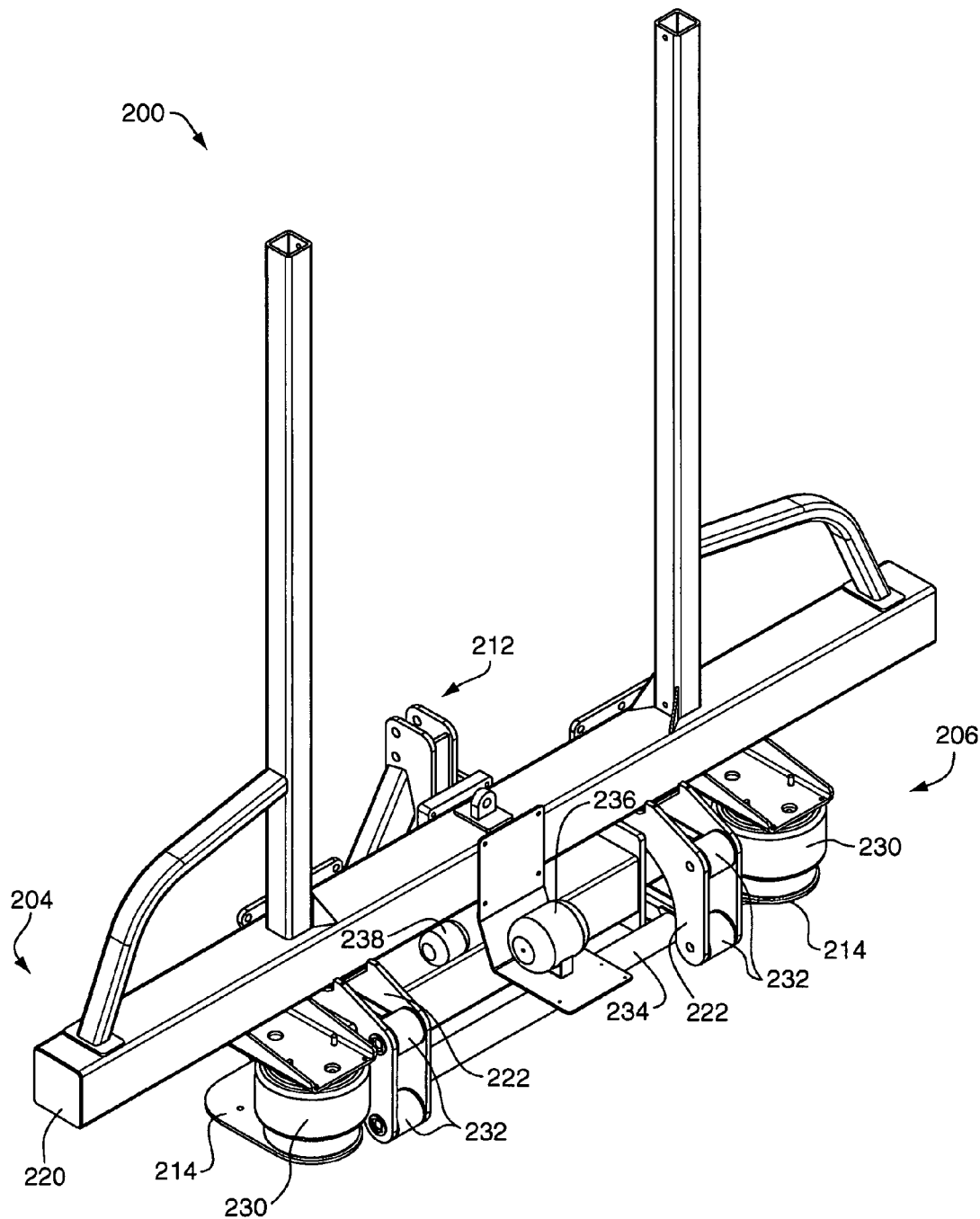
FIG. 3 illustrates another isometric view of the equipment in an example of the invention.

FIG. 3 illustrates another isometric view of equipment 200 in an example of the invention. Air suspension 206 comprises a set of air springs 230. In other examples, air suspension 206 may comprise more or less air springs 230. Each air spring 230 connects between a support base 214 of three-point hitch 202 and main frame 220 of implement 204. Air suspension 206 also includes an air tank 236 and a pump 238. Pump 238 is configured to pressurize air tank 236. Air tank 236 is configured to increase the pressure in air springs 230.

Air suspension 206 also includes support arms 232. Air suspension 206 may include more or less support arms 232 as desired. The number of arms, the configuration of the arms, and the design of the arms are just an example. One end of each support arm 232 connects to a bracket 222 of main frame 220. Support arms 232 connect to bracket 222 through bushings. The bushings may be rubber, plastic, or some other pliable material. The lower support arms 232 are coupled to each other via a torsion bar 234. Air suspension 206 may also include other components not shown.

Figure 4:
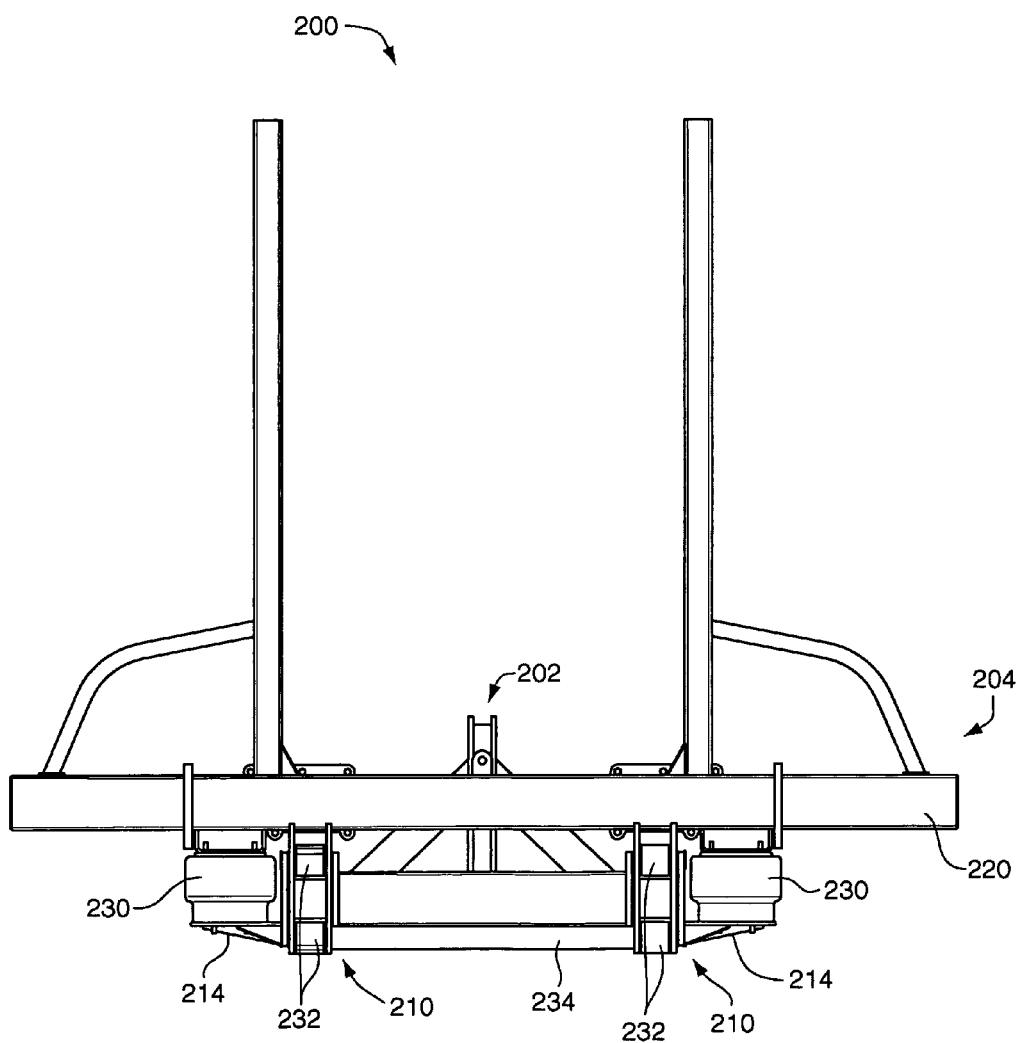
FIG. 4 illustrates a front view of the equipment in an example of the invention.

FIG. 4 illustrates a front view of equipment 200 in an example of the invention. The other end of each support arm 232 shown in FIG. 3 connects to lower three-point interfaces 210 of three-point hitch 202. Support arms 232 connect to lower three-point interfaces 210 through bushings.

Figure 5:
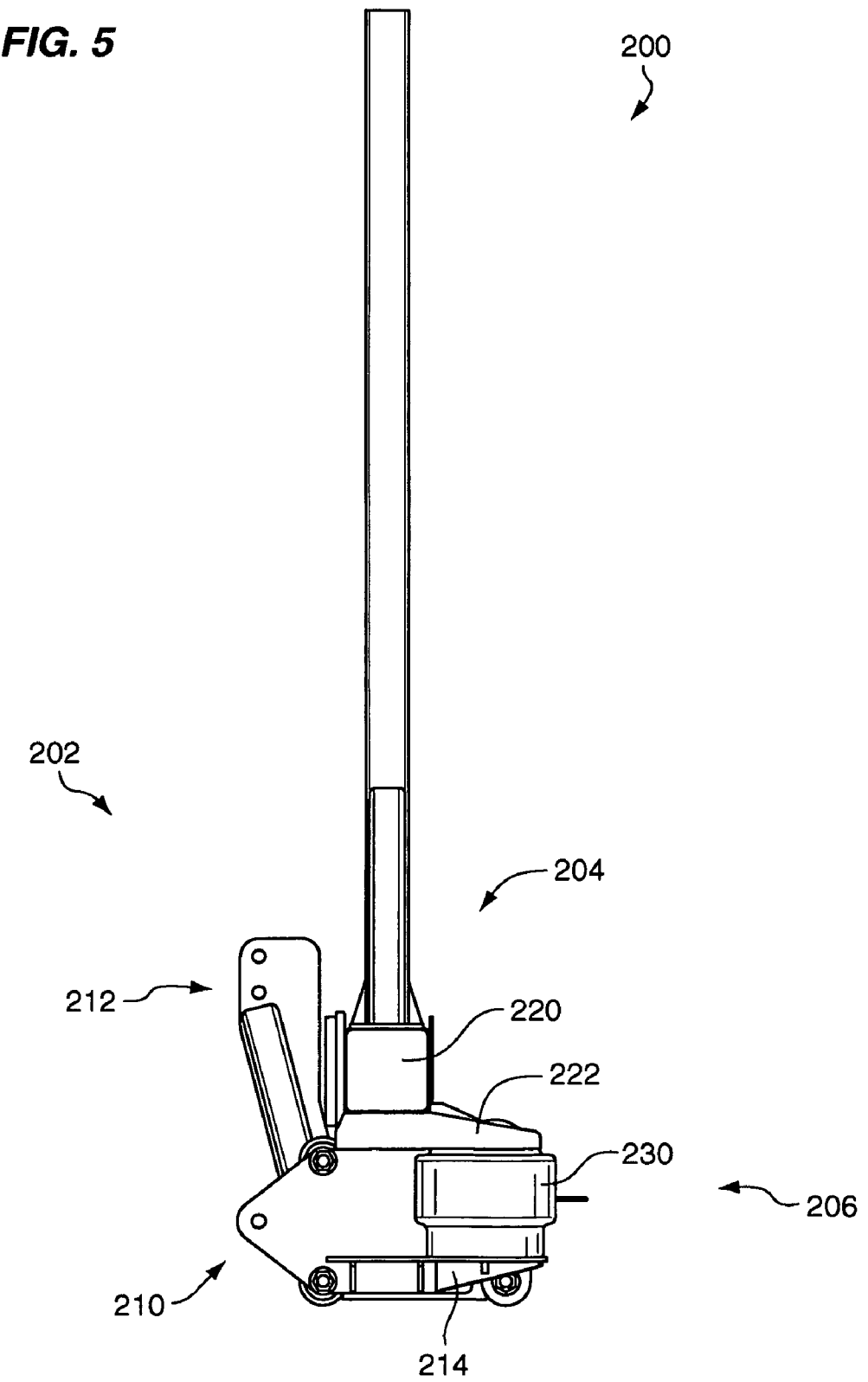
FIG. 5 illustrates a side view of the equipment in an example of the invention.

FIG. 5 illustrates a side view of equipment 200 in an example of the invention. FIG. 5 further shows how air springs 230 are mounted between support base 214 of three-point hitch 202 and bracket 222 of main frame 220.

Figure 6:
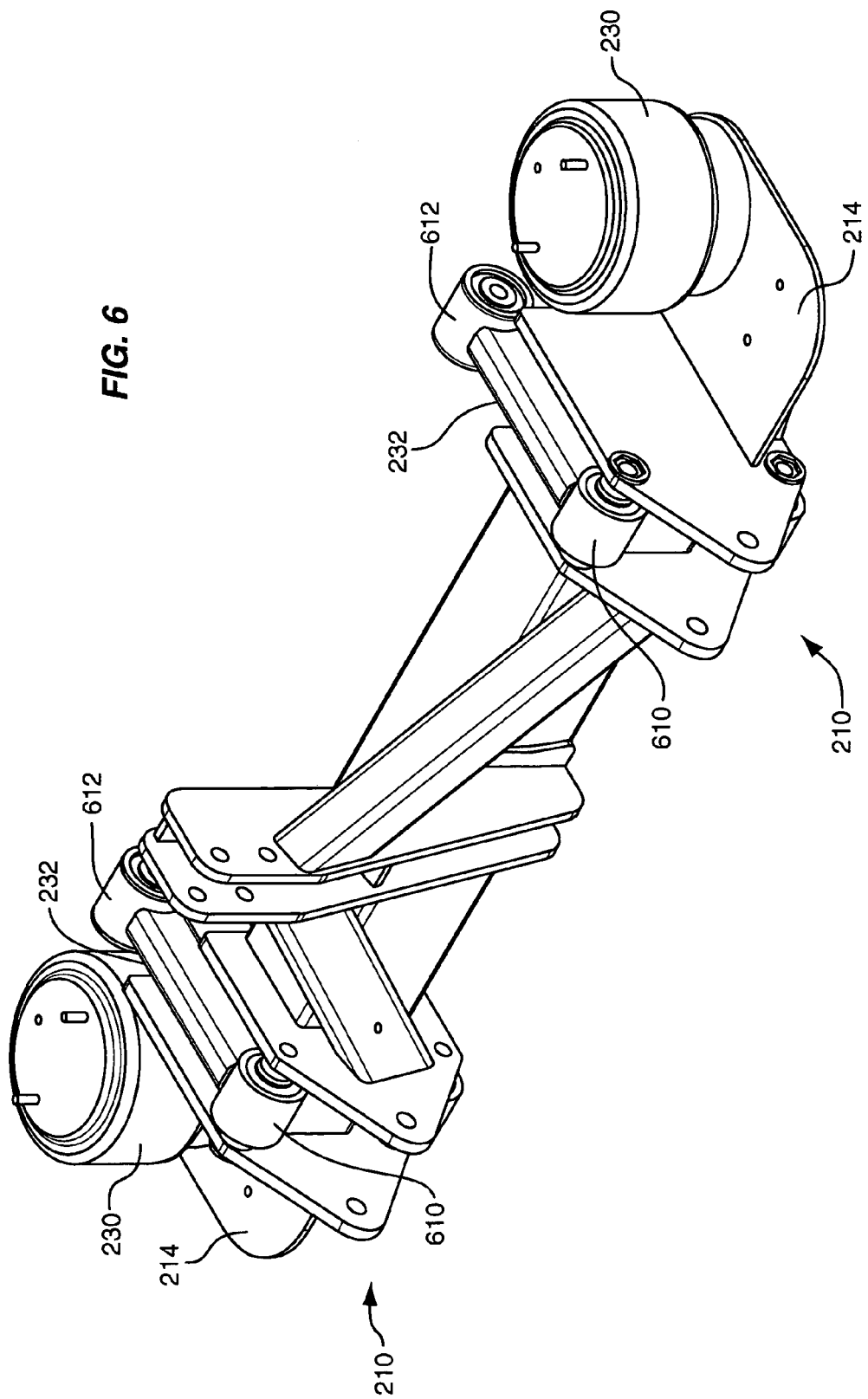
FIG. 6 illustrates an isometric view of the equipment with the implement taken away in an example of the invention.

FIG. 6 illustrates an isometric view of equipment 200 with implement 204 taken away in an example of the invention. With implement 204 taken away, FIG. 6 shows the upper support arms 232. A first end 610 of support arms 232 connect to lower three-point interfaces 210. A second end 612 of support arms 232 connect to brackets 222 of main frame 220 of implement 204 (not shown in FIG. 6). The first end 610 and the second end 612 connect using bushings.

Figure 7:
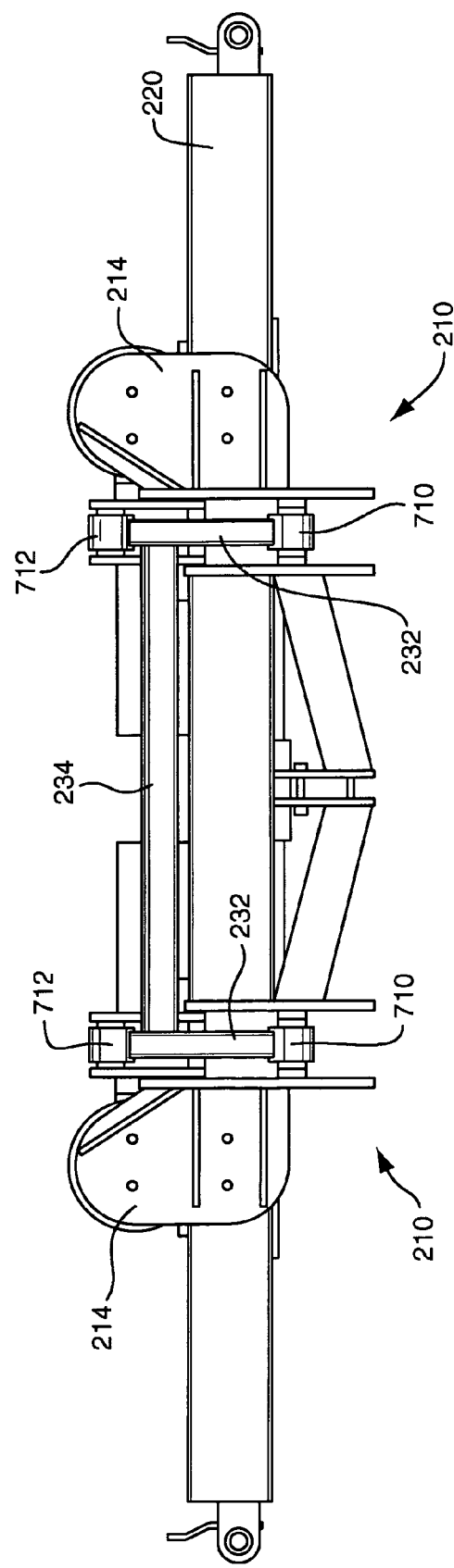
FIG. 7 illustrates a bottom view of the equipment in an example of the invention.

FIG. 7 illustrates a bottom view of equipment 200 in an example of the invention. The bottom view shows the lower support arms 232. A first end 710 of support arms 232 connect to the lower three-point interfaces 210. A second end 712 of support arms 232 connect to brackets 222 of main frame 220 of implement 204 (not shown in FIG. 7). The first end 710 and the second end 712 connect using bushings. The bottom support arms 232 are connected to one another via torsion bar 234.

In FIGS. 2–7, air suspension 206 is configured to dampen movement between three-point hitch 202 and implement 204. Assume that three-point hitch 202 is coupled to a tractor. In use, the tractor carrying apparatus 200 may encounter rough terrain. The rigid connection between the tractor and three-point hitch 202 transfers movement of the tractor, due to the terrain, to three-point hitch 202. The movement of the tractor due to the terrain may be a bouncing or jarring movement. The rigid connection also transfers vibration from the tractor to three-point hitch 202. Air suspension 206 dampens the movement and vibration transferred to three-point hitch system 202 to help avoid transferring the movement and vibration to implement 204.

In air suspension 206, air springs 230 are configured to absorb vertical loading of implement 204 caused by the tractor or implement 204. Support arms 232, and the bushings used in support arms 232, act like shock absorbers to dampen up and down action of implement 204. Support arms 232 also absorb yaw action caused by short correctional turns during fore and aft movement of implement 204.

Air tank 236, pump 238, and a control valve (not shown) inflate and deflate air springs 230 to a desired pressure. The control valve may comprise an automatic height control valve. The control valve may adjust the pressure in air springs 230 for the following: to maintain even height of implement 204, for transport position of implement 204, for field operating position of implement 204, based on the terrain of the field, based on the weight of implement 204, or other conditions.

Air tank 236, pump 238, and the control valve may be controlled by a control system (not shown). The control system may be located on implement 204 or in the cab of the tractor. The control system may be configured to monitor the pressure in air springs 230, and increase and decrease the pressure in air springs 230.

EXAMPLE #3—FIGS. 8–14

FIGS. 8–14 illustrate a three-point sprayer 800 in an example of the invention. Sprayer 800 comprises an agricultural sprayer 800 in this example. In other examples, sprayer 800 could be a lawn and garden sprayer, a construction sprayer, etc. Sprayer 800 is configured to couple to a three-point of a tractor. The tractor may be a two-wheel drive tractor with tires, a front wheel assist tractor with tires, a tractor with tracks, or another tractor with a three-point.

Figure 8:
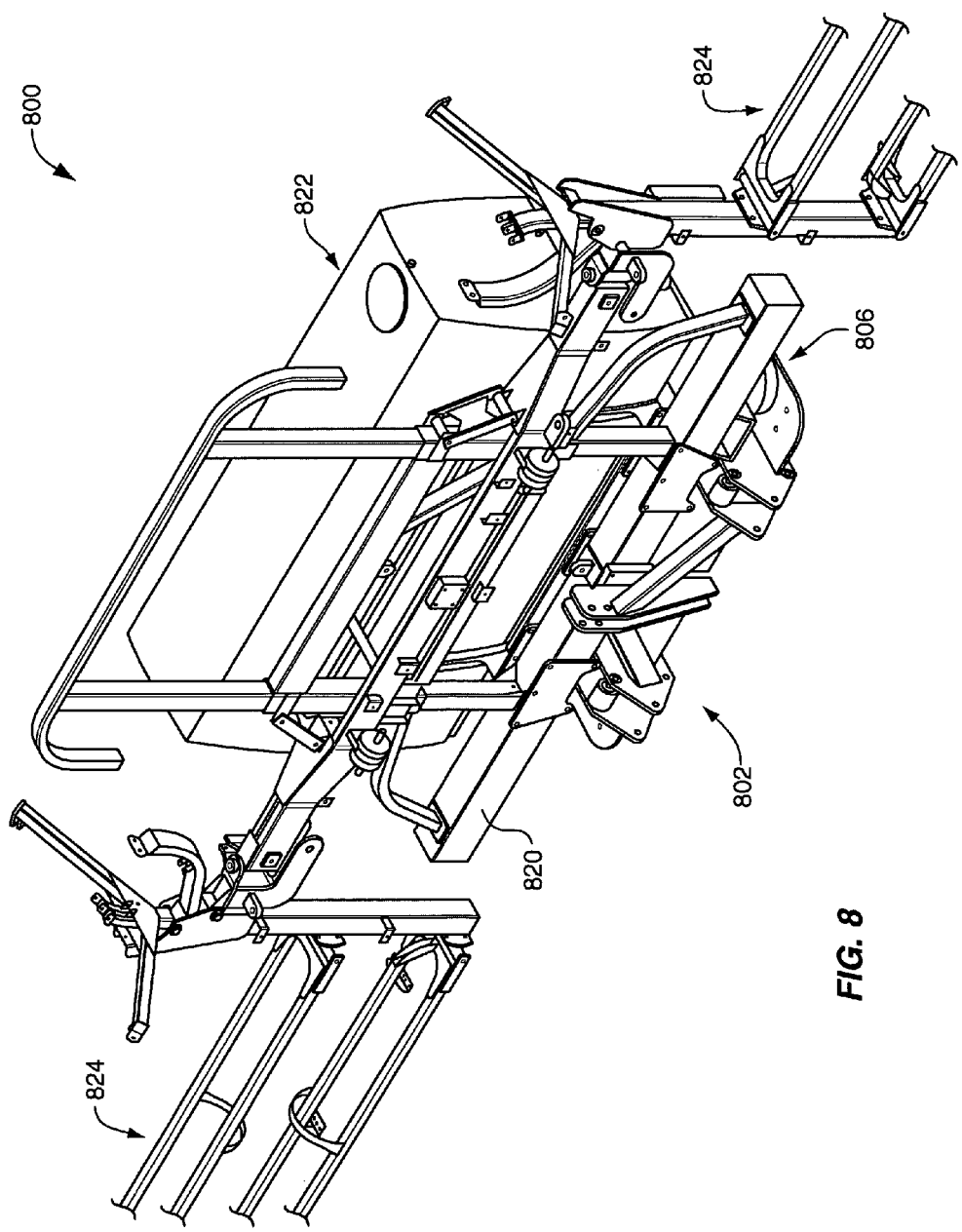
FIG. 8 illustrates an isometric view of a sprayer in an example of the invention.

FIG. 8 illustrates an isometric view of sprayer 800 in an example of the invention. Sprayer 800 includes a three-point hitch 802, an air suspension 806, a main frame 820, a tank 822, and booms 824. Three-point hitch 802 is configured to connect to a three-point of a tractor. Air suspension 806 is coupled between three-point hitch 802 and main frame 820. Sprayer 800 may include any suspension system between three-point hitch 802 and main frame 820, such as mechanical springs, shocks, etc. The rest of sprayer 800, such as booms 824 and tank 822, connect to main frame 820. There are other components on sprayer 800 that are not described for the sake of brevity.

Figure 9:
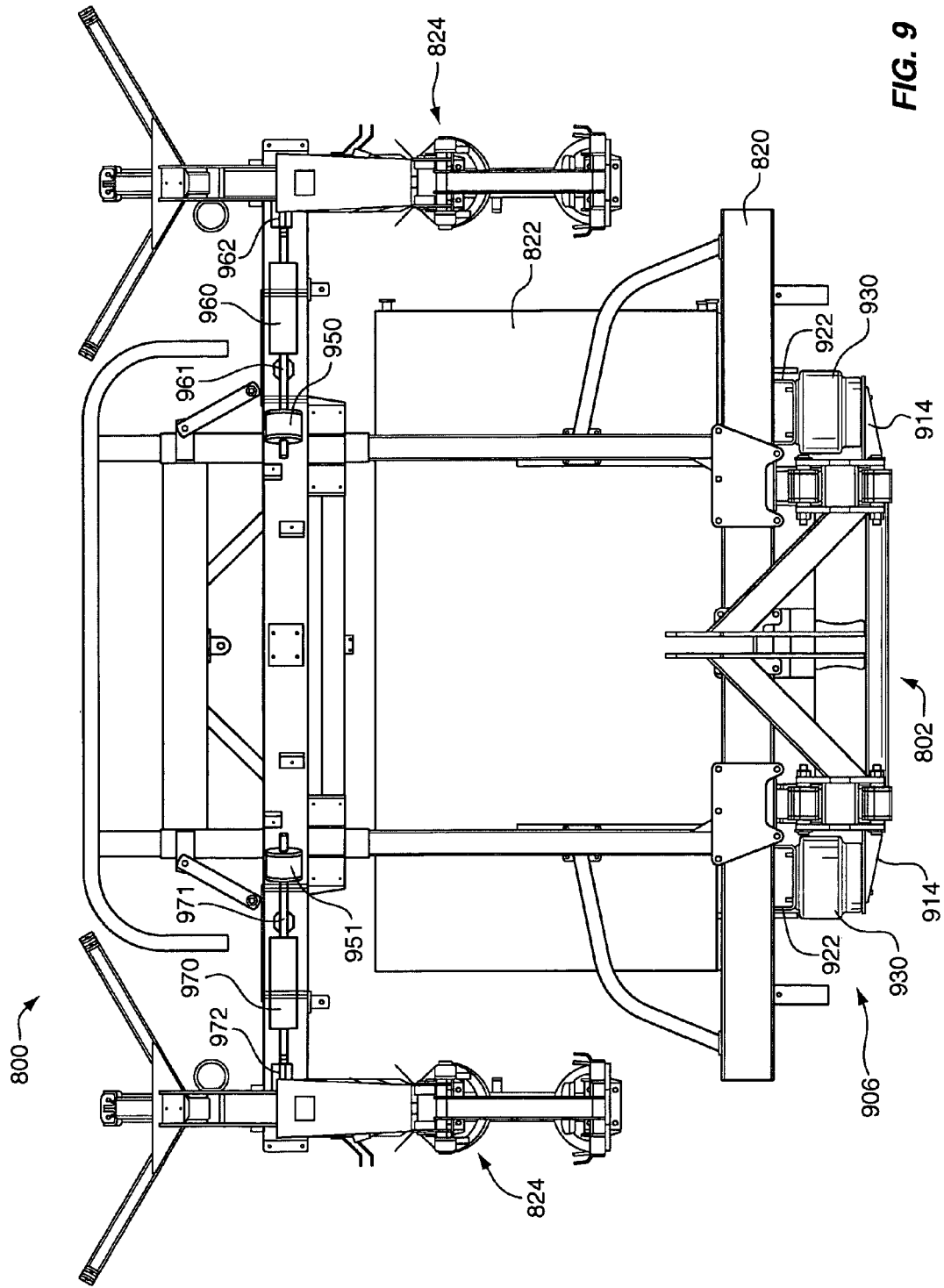
FIG. 9 illustrates a front view of the sprayer in an example of the invention.

FIG. 9 illustrates a front view of sprayer 800 in an example of the invention. Three-point hitch 802 includes support bases 914. Air suspension 806 includes air springs 930. Air springs 930 are bolted to the support bases 914 of three-point hitch 802. Support bases 914 have holes drilled in them to mount the air springs 930. Main frame 820 includes mounting brackets 922 that hang down from the main frame 820. Air springs 930 are also bolted to the mounting brackets 922 of the main frame 820.

Sprayer 800 also includes dampening systems 950 and 951 and hydraulic cylinders 960 and 970. Dampening system 950 is connected to point 961 of sprayer 800. Cylinder 960 is connected to dampening system 950 and point 962 of boom 824. Cylinder 960 is configured to swing one of the booms 824 between field position and transport position. Dampening system 951 is connected to point 971 of sprayer 800. Cylinder 970 is connected between dampening system 951 and point 972 of boom 824. Cylinder 970 is configured to swing the other boom 824 between field position and transport position.

Figure 10:
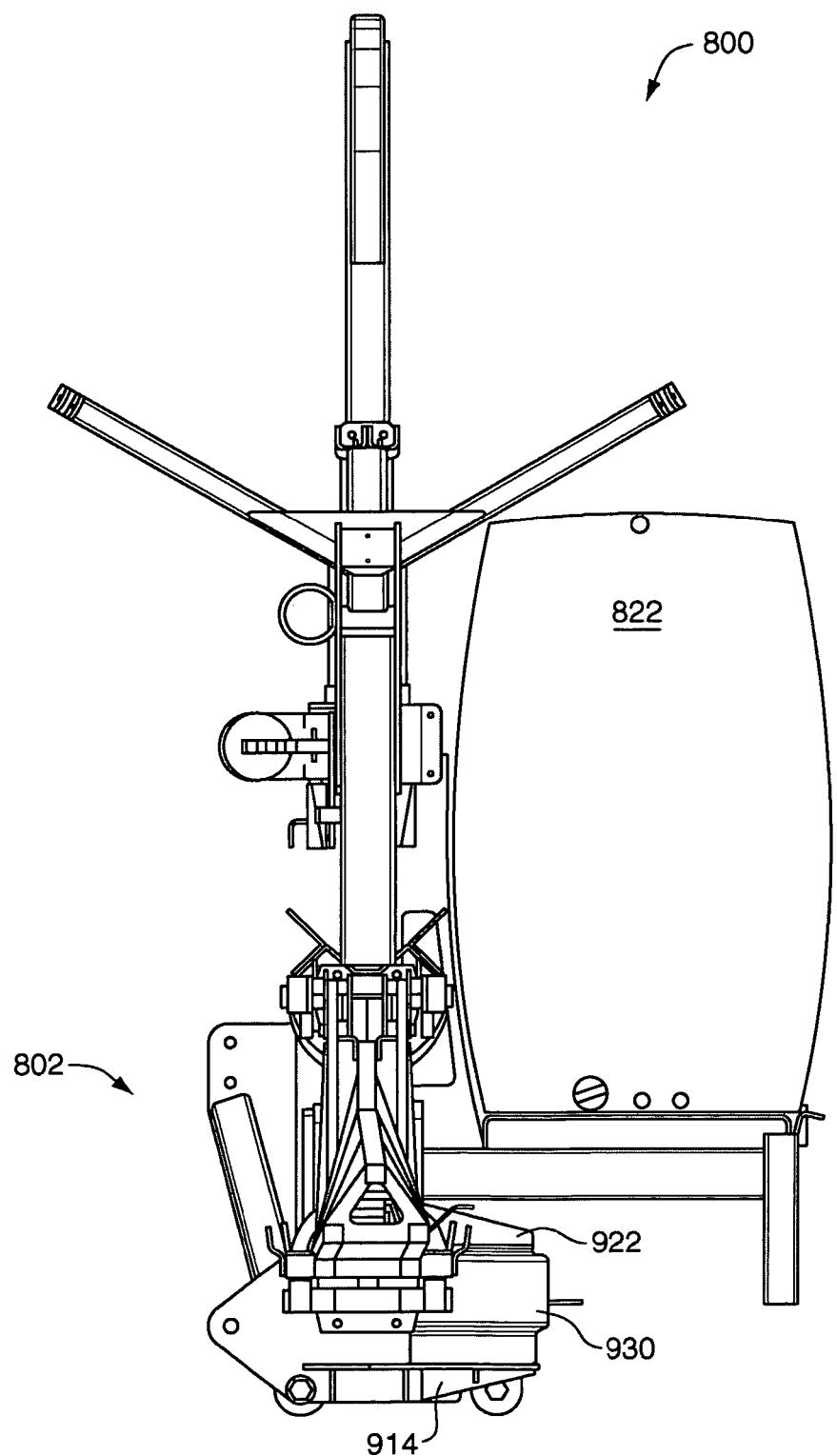
FIG. 10 illustrates a side view of the sprayer in an example of the invention.

FIG. 10 illustrates a side view of sprayer 800 in an example of the invention. FIG. 10 further shows how air springs 930 are connected between support bases 914 and brackets 922 of main frame 820.

Figure 11:
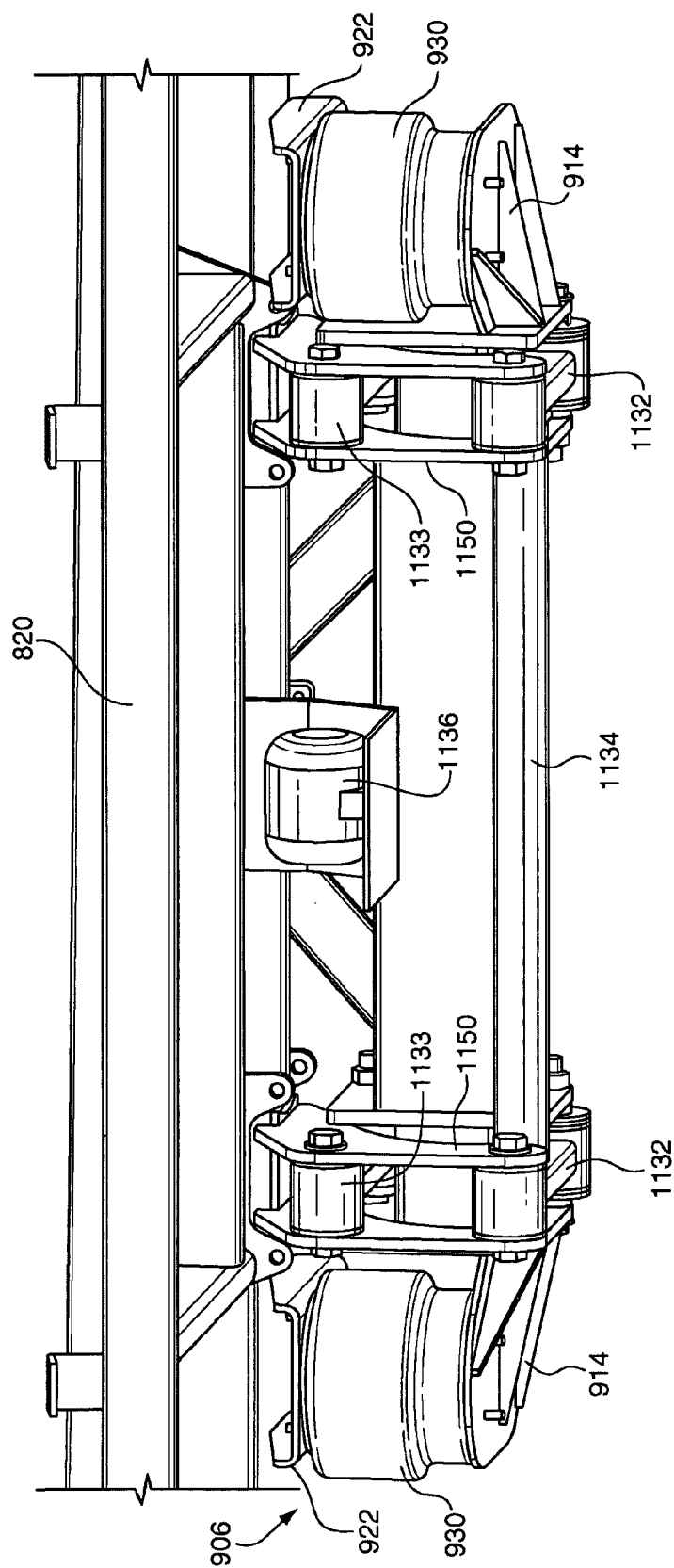
FIG. 11 illustrates a back view of an air suspension of the sprayer in an example of the invention.

FIG. 11 illustrates a back view of air suspension 806 in an example of the invention. Air suspension 806 includes lower support arms 1132 and upper support arms 1133, torsion bar 1134, and air tank 1136. Lower support arms 1132 connect at one end to three-point hitch 802 and connect at the other end to brackets 1150 of main frame 820. Similarly, upper support arms 1133 connect at one end to three-point hitch 802 and connect at the other end to brackets 1150 of main frame 820. Upper support arms 1132 and lower support arms 1133 are parallel arms that help support the main frame 820 on the three-point hitch 802.

Air suspension 806 may also include a pump (not shown) connected to air tank 1136, and a control valve (not shown). An example of the pump comprises an air compressor. The pump, air tank 1136, and the control valve are configured to control the pressure in air springs 930. The control valve controls the pump and air tank 1136 to inflate and deflate air springs 930 to a desired pressure. The control valve may comprise an automatic height control valve. The control valve may adjust the pressure in air springs 930 for the following: to maintain even height of sprayer 800, for transport position of sprayer 800, for field operating position of sprayer 800, based on the terrain of the field, based on the weight of sprayer 800, or other conditions. An example of the control valve comprises an air valve used in semi tractors and trucks to control the pressure in an air suspension.

Air suspension 806 may also include a control system (not shown) configured to control the pump and air tank 1136. The control system may be located on sprayer 800 or in the cab of the tractor. The control system may be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Figure 12:
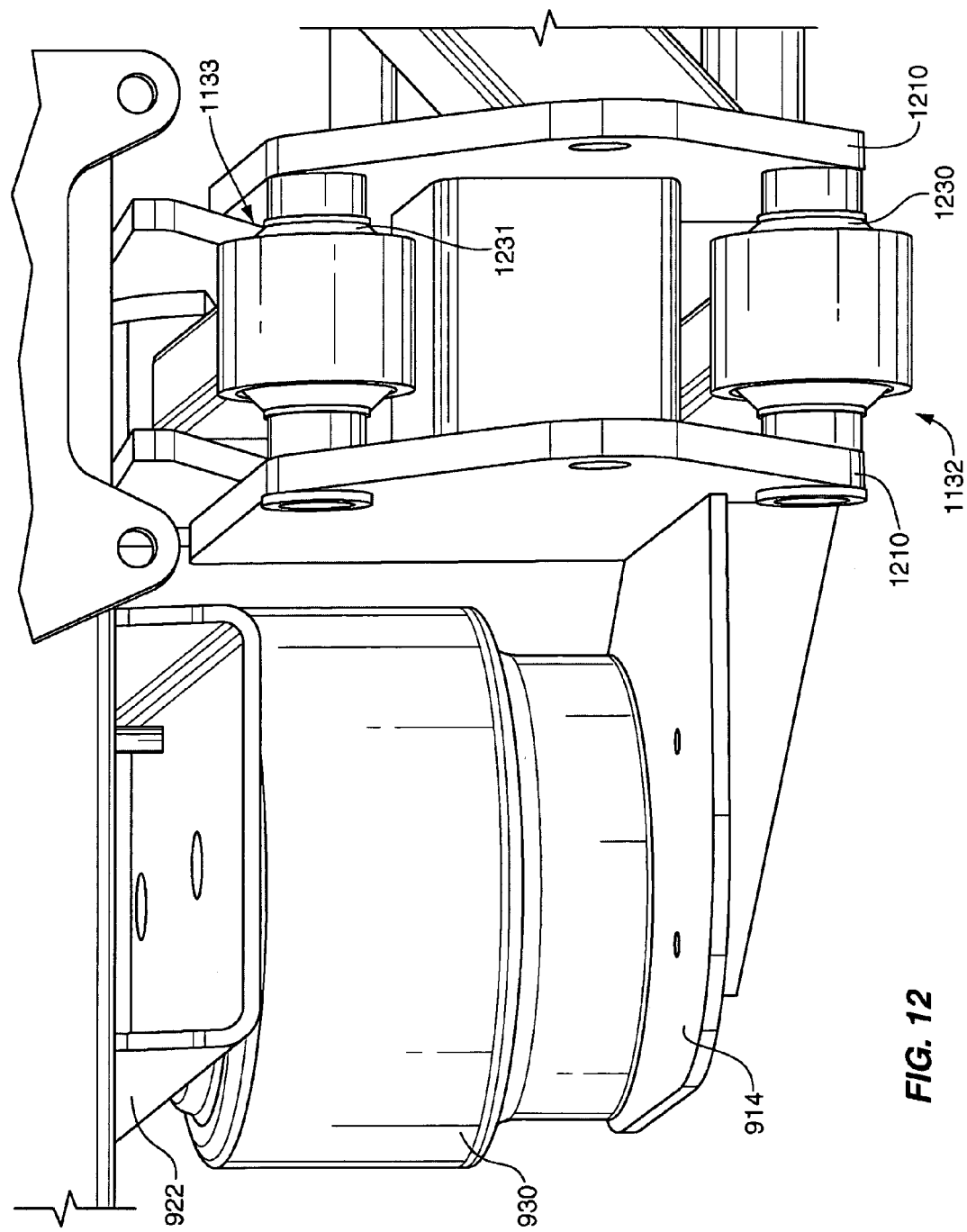
FIG. 12 illustrates a front view of the air suspension of the sprayer in an example of the invention.

FIG. 12 illustrates a front view of air suspension 806 in an example of the invention. One end of lower support arm 1132 is bolted to a bracket 1210 of three-point hitch 802. The other end of lower support arm 1132 is bolted to bracket 1150 of main frame 820 (see FIG. 11). Lower support arm 1132 is connected to bracket 1210 through a rubber bushing 1230. One end of upper support arm 1133 is bolted to a bracket 1210 of three-point hitch 802. The other end of upper support arm 1133 is bolted to bracket 1150 of main frame 820 (see FIG. 11). Upper support arm 1133 is connected to bracket 1210 through a rubber bushing 1231.

Figure 13:
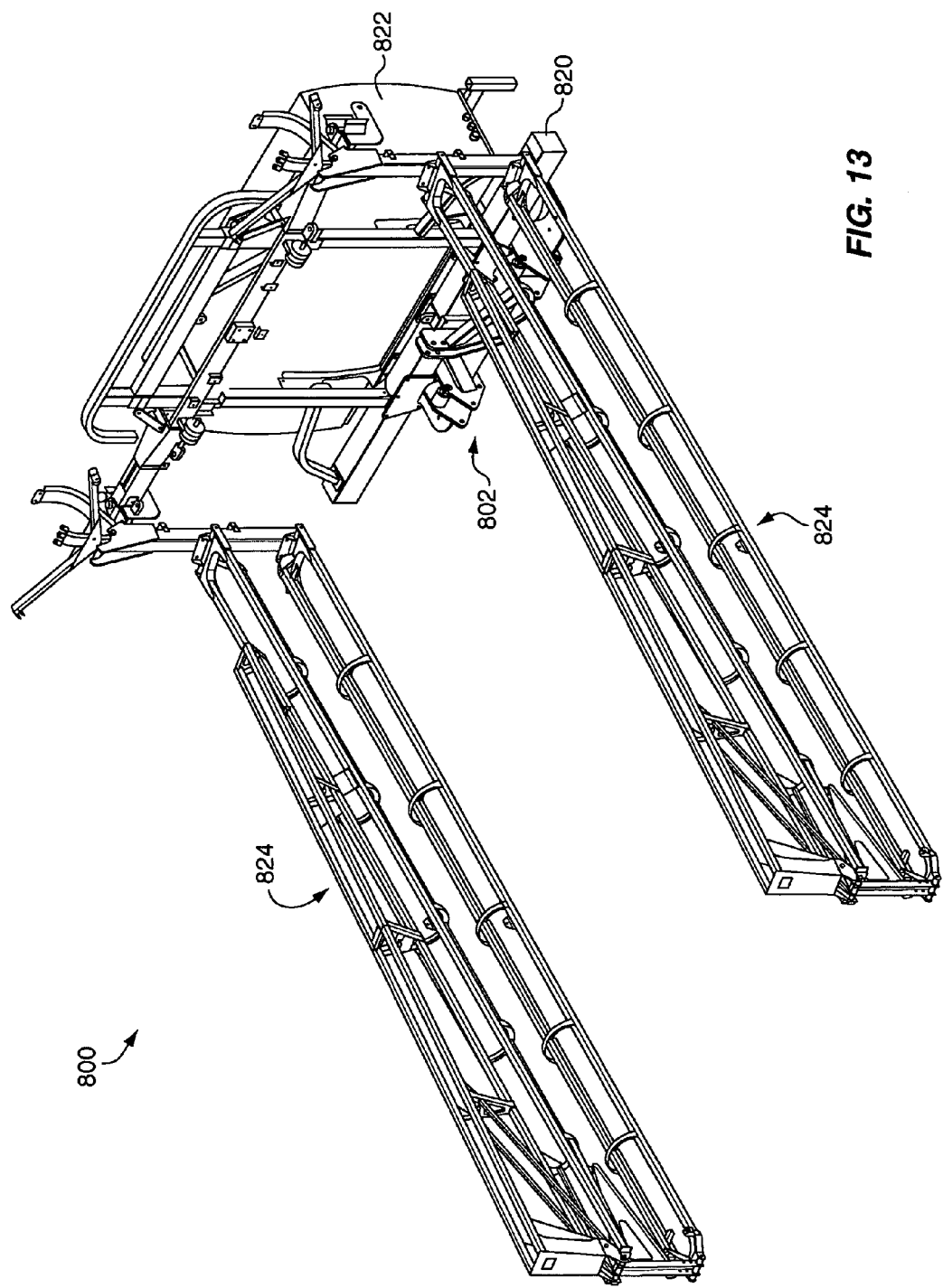
FIGS. 13–14 illustrate views of the sprayer in a transport position in an example of the invention.
Figure 14:
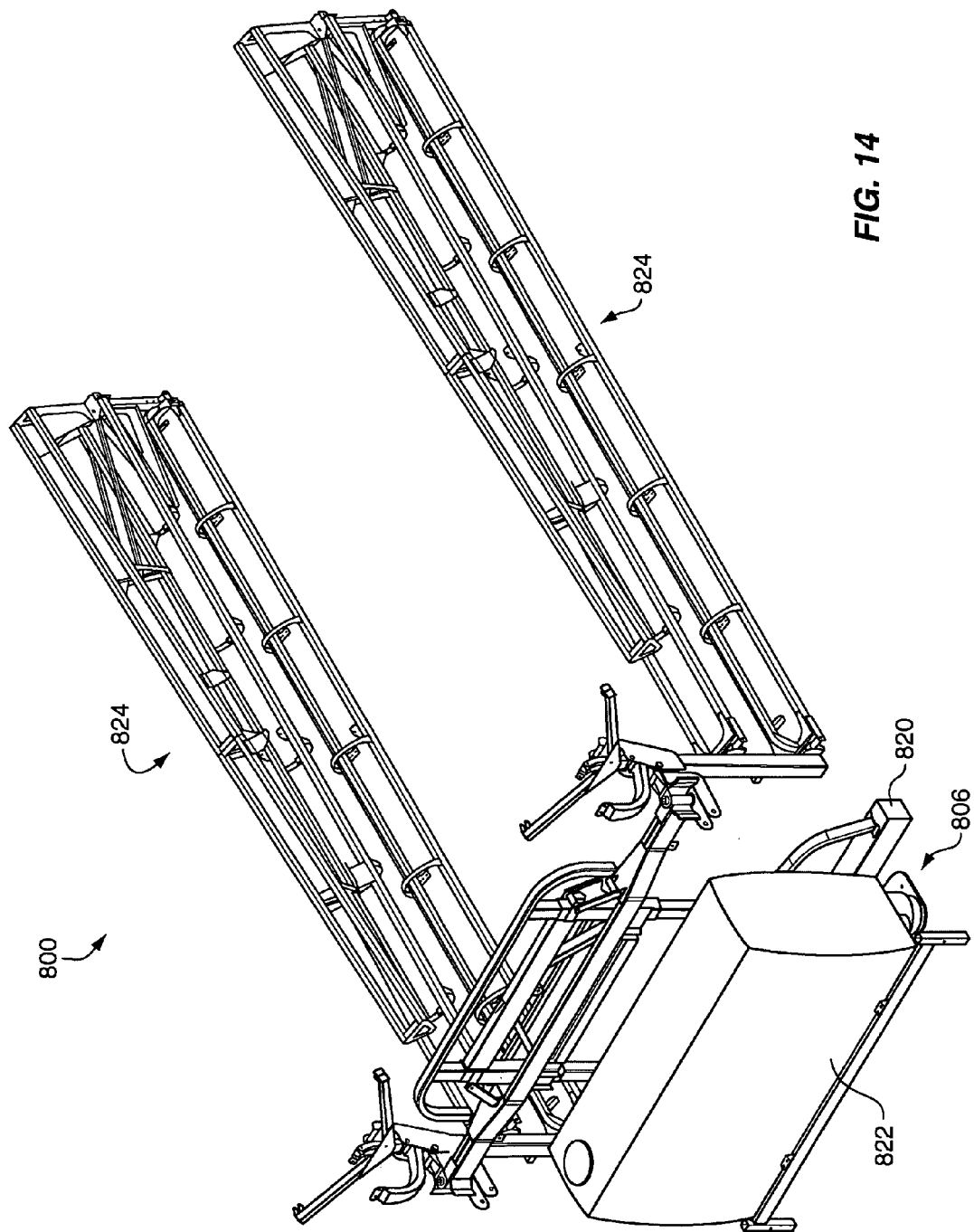

FIGS. 13–14 illustrate views of sprayer 800 in the transport position in an example of the invention. Sprayer 800 comprises any sprayer with booms. Sprayer 800 may be 60 feet long, 90 feet long, 120 feet long, etc. To achieve such lengths, the booms 824 of sprayer 800 become very long. The durability, especially in rough terrain, may become more of an issue as the booms 824 get longer.

In FIGS. 8–14, air suspension 806 is configured to dampen movement between three-point hitch 802 and main frame 820 of sprayer 800. Assume that three-point hitch 802 is coupled to a tractor. In use, the tractor carrying sprayer 800 may encounter rough terrain. The rigid connection between the tractor and three-point hitch 802 transfers movement of the tractor, due to the terrain, to three-point hitch 802. The movement of the tractor due to the terrain may be a bouncing or jarring movement. The rigid connection also transfers vibration from the tractor to three-point hitch 802.

Air suspension 806 dampens the movement and vibration transferred to three-point hitch 802 to help avoid transferring the movement and vibration to the rest of sprayer 800. In essence, air suspension 806 helps isolate three-point hitch 802 from the rest of the sprayer 800.

In air suspension 806, air springs 930 absorb the movement and vibration of three-point hitch 802. Air springs 930 absorb vertical loading of sprayer 800. The vertical load may be caused by the terrain, by sloshing of liquid in tank 822, or other factors.

Support arms 1132 and 1133, and the bushings 1230 and 1231 used in support arms 1132 and 1133, act like shock absorbers to dampen up and down action of sprayer 800. Support arms 1132 and 1133 also absorb yaw action caused by short correctional turns during fore and aft movement of sprayer 800.

Dampening systems 950 and 951 are configured to dampen movement between the booms 824 and the rest of sprayer 800. Dampening systems 950 and 951 absorb fore and aft movement of booms 824 to help avoid transferring the movement to the rest of the sprayer 800. Dampening systems 950 and 951 also absorb fore and aft movement of the tractor and sprayer 800 to help avoid transferring the movement to the booms 824. An example of dampening systems 950 and 951 comprise rubber mounts connected to one or both ends of cylinders 960 and 970.

Advantageously, sprayer 800 may be more durable due to air suspension 806 and dampening systems 950 and 951. By dampening movement from three-point hitch 802, air suspension 806 may minimize some stress on the tank, the main structure, and the booms of sprayer 800. Air suspension 806, may allow for faster operating speeds for sprayer 800. Air suspension 806 may also minimize the damage to the tractor caused by sprayer 800 being attached to it. Air suspension 806 may also allow for the boom width of sprayer 800 to increase to 90 feet, 120 feet, or more with less concern for the booms being damaged in use.

What is claimed is:

1. A three-point apparatus, comprising:
    an implement;
    a hitch system comprising:
        a base,
        a three-point interface connected to the base and configured to connect to a three-point system,
        a first arm having a first end coupled to the three-point interface and a second end coupled to the implement,
        a second arm having a first end coupled to the three-point interface and a second end coupled to the implement, and
        a torsion bar connecting the first arm and the second arm; and
    a suspension system coupled between the base of the hitch system and the implement.

2. The three-point apparatus of claim 1 wherein the suspension system comprises an air suspension system.

3. The three-point apparatus of claim 2 wherein the air suspension system includes at least one air spring.

4. The three-point apparatus of claim 2 wherein the air suspension system includes:
    a first air spring coupled between the implement and a first side of the base of the hitch system; and
    a second air spring coupled between the implement and a second side of the base of the hitch system.

5. The three-point apparatus of claim 2 wherein the air suspension system includes an air tank.

6. The three-point apparatus of claim 5 wherein the air suspension system includes an air pump coupled to the air tank.

7. The three-point apparatus of claim 1 wherein the suspension system includes at least one spring.

8. The three-point apparatus of claim 1 wherein the suspension system includes:
    a first spring coupled between the implement and a first side of the base of the hitch system; and
    a second spring coupled between the implement and a second side of the base of the hitch system.

9. The three-point apparatus of claim 1 wherein the hitch system further comprises:
    a first bushing between a coupling of the first end of the first arm and the three-point interface; and
    a second bushing between a coupling of the second end of the first arm and the implement.

10. The three-point apparatus of claim 1 wherein the hitch system further comprises:
    a third arm having a first end coupled to the three-point interface and a second end coupled to the implement; and
    a fourth arm having a first end coupled to the three-point interface and a second end coupled to the implement.

11. The three-point apparatus of claim 1 wherein the hitch system is configured to connect to three-point arms of a tractor.

12. The three-point apparatus of claim 1 wherein the implement comprises a sprayer.

13. The three-point apparatus of claim 12 wherein the sprayer includes a tank and booms, and wherein the air suspension system is configured to dampen movement between the base of the hitch system and the tank and booms.

14. The three-point apparatus of claim 13 wherein the sprayer further comprises:
    a cylinder configured to fold one of the booms; and
    a dampening system coupled to the cylinder and configured to dampen movement of the one boom when the one boom is unfolded.

15. The three-point apparatus of claim 14 wherein the dampening system comprises:
    at least one rubber mount coupled between the cylinder and a main frame of the sprayer.

16. The three-point apparatus of claim 1 wherein the implement comprises a cultivator.

17. The three-point apparatus of claim 1 wherein the implement comprises a planter.

18. A three-point apparatus, comprising:
a hitch system compring:
- a base, and
- a three-point interface connected to the base and configured to connect to a three-point system;

an implement; and
a suspension system coupled between the base of the hitch system and the implement;
wherein the implement comprises a sprayer that includes a tank and booms;
wherein the suspension system is configured to dampen movement between the base of the hitch system and the tank and booms.

19. The three-point apparatus of claim 18 wherein the sprayer further comprises:
- a cylinder configured to fold one of the booms; and
- a dampening system coupled to the cylinder and configured to dampen movement of the one boom when the one boom is unfolded.

20. The three-point apparatus of claim 18 wherein the dampening system comprises:
- at least one rubber mount coupled between the cylinder and a main frame of the sprayer.

* * * * *

UNITED STATES PATENT AND TRADEMARK OFFICE
CERTIFICATE OF CORRECTION

PATENT NO. : 7,021,396 B2  Page 1 of 1
DATED : April 4, 2006
INVENTOR(S) : Steinberger et al.

It is certified that error appears in the above-identified patent and that said Letters Patent is hereby corrected as shown below:

Column 8,
Line 50, delete "air".

Signed and Sealed this

Sixteenth Day of May, 2006

JON W. DUDAS
*Director of the United States Patent and Trademark Office*